United States Patent [19]
Reynolds

[11] 3,738,317
[45] June 12, 1973

[54] APPARATUS AND METHOD FOR HATCHING FISH

[76] Inventor: John D. Reynolds, 1093 Kent Road N.W., Winston-Salem, N.C. 27104

[22] Filed: Feb. 3, 1971

[21] Appl. No.: 112,276

[52] U.S. Cl. .................................................. 119/3
[51] Int. Cl. ........................................... A01k 61/00
[58] Field of Search .................................... 119/3, 5

[56] References Cited
UNITED STATES PATENTS

| | | | |
|---|---|---|---|
| 3,116,712 | 1/1964 | Ogden et al. | 119/3 |
| 3,028,837 | 4/1962 | Tuttle | 119/3 |
| 1,976,159 | 10/1934 | Bridge | 119/44 |
| 1,654,372 | 12/1927 | Grimes | 119/42 X |

*Primary Examiner*—Hugh R. Chamblee
*Attorney*—Charles Y. Lackey

[57] ABSTRACT

Apparatus for and method of incubating a plurality of fish eggs wherein the apparatus includes a frame holding a plurality of selectively positioned trays each supporting a quantity of fish eggs within a circulating source of aerated spring water. The water has been subjected to ultraviolet rays by appropriate means prior to its introduction to the fish eggs for purification. The method involves uniformly circulating aerated spring water about the eggs after subjecting the water to ultraviolet rays to kill inhibiting fungus while prohibiting the introduction of air to the eggs.

1 Claim, 6 Drawing Figures

PATENTED JUN 12 1973 3,738,317

INVENTOR
JOHN D. REYNOLDS

BY Charles G. Lackey
attorney

APPARATUS AND METHOD FOR HATCHING FISH

BACKGROUND, BRIEF SUMMARY AND OBJECTIVES OF THE INVENTION

This invention relates to improvements in fish egg incubator devices and a process for hatching fish eggs.

Conventional hatching techniques for fish eggs usually involve continuously circulating water about the eggs while introducing critical portions of chemicals primarily to control fungus generated therein and secondarily to provide necessary bone hardening ingredients for the eggs. This application of chemicals is time consuming, tedious and costly to maintain.

The present invention is directed to an incubating apparatus and method wherein the necessary bone hardening substances for the fish eggs are provided from the natural minerals in aerated spring water and the fungus control is accomplished by ultraviolet rays to purify the water. Fungus growth is further surpressed by isolating the fish eggs from the air during the hatching process. Deep well water is very well suited for use in the present concept because the water is naturally clean (thus avoiding costly filters) and its temperature remains relatively constant.

Basically the apparatus for incubating fish eggs described herein contains a frame, a plurality of trays in alignment within the frame, a source of spring water for continuously surrounding the trays of eggs in the frame, some means for aerating the water, and an ultraviolet ray source to purify the water prior to its introduction to the eggs and destroy fungus during the incubating process. The tray alignment is preferably circular, and the capacity of such an incubator is vastly greater than those of conventional construction since elimination of the tedious and critical step of adding chemicals permits the process to take place on a much larger scale.

Accordingly, an object of the present invention is to provide apparatus and a method which will contribute to breeding and nurturing of food fish.

Another object of the present invention is to provide a fish egg incubator housed in continuously circulating and aerated spring water which will isolate the eggs from the outside air and purify the water with ultraviolet rays prior to its introduction to the eggs.

Yet another object of the present invention is to provide a simplified incubating process which can take place on a much larger scale than conventional techniques for hatching food fish.

These and other objects of the present invention will become more apparent after a consideration of the following detailed specification taken in conjunction with the accompanying drawings wherein like characters of reference designate like parts throughout the several views.

FIGURE DESCRIPTION

DETAILED DESCRIPTION OF THE DISCLOSURE

The process of hatching a plurality of fish eggs is difficult in that the fungus, saphrolegnia, will spread through the incubating eggs as some of the eggs die since the fungus itself is generated by dead eggs. Normally chemicals such as Formilan or Malachite Green in critical amounts are used to treat this fungus forming on dead fish eggs. Because of the treatment usually employed, only a limited number of eggs can be hatched during a single incubating process because introduction of these chemicals is tedious, time consuming and expensive.

In utilizing the present invention, it is necessary to aerate and circulate water about the eggs, however the water must be purified by suitable ultraviolet ray means. It is extremely important that no outside, unpurified air be allowed to reach the eggs during the incubating process.

Figure 1:
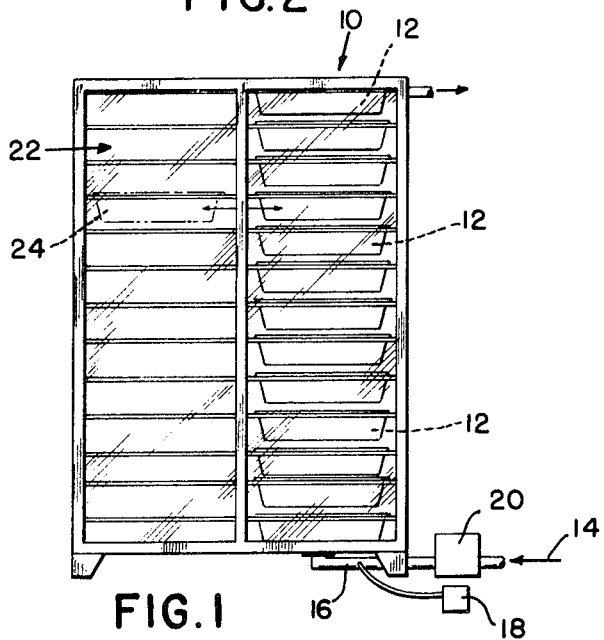
FIG. 1 is a side elevational sectional view of an incubating apparatus having a plurality of trays in vertical alignment.

In considering apparatus for practicing the present inventive process, reference is made now to FIG. 1 wherein a frame shown generally as 10 houses a plurality of trays 12 each of which supports a large quantity of fish eggs (not shown). The frame and trays are enclosed within a tank. A source of spring water 14, preferably a deep well, is directed into the frame through a suitable conduit 16 so that the water will be continuously and consistently circulated, preferably upwardly, throughout the trays. An aerator 18 of any conventional design is suitably positioned to provide sufficient oxygen to the water prior to its circulation within the frame 10.

The water is purified by the provision of a conventional ultraviolet ray generating device 20 conveniently located so that water conduit 16 carries the water therethrough prior to introduction to the eggs supported within the frame 10 by the trays 12. It will be obvious however that an ultraviolet source may be provided nearer the water source if desired.

It is desirable to construct the frame so that the trays are selectively removable from the vertical alignment set forth in FIG. 1, consequently an adjacent vertical column 22 is provided, each section of which communicates with the adjacent section of the first column so that an individual tray, for example that designated 24, can be removed from one vertically aligned column by displacing it laterally to column 22 and lifting it upwardly therefrom in a conventional manner. This permits inspection or removal of selective trays of eggs from the incubating process if that is desirable.

Figure 3:
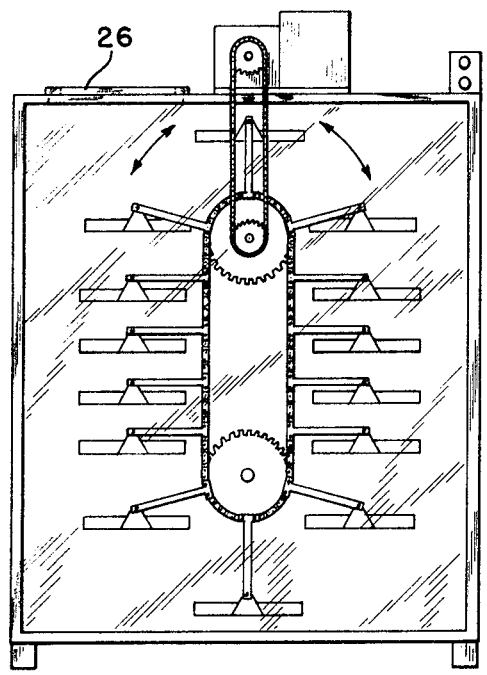
FIG. 3 is an alternative embodiment of the apparatus illustrated in FIGS. 1 and 2 wherein the trays held in vertical alignment are continuously moved upwardly and downwardly in a predetermined path of travel.

Another alternative of the present hatching apparatus is shown in FIG. 3 and embodies a wheel or sprocket driven assembly suitably designed to permit the continuous upward and downward movement of trays held in vertical alignment to insure consistent circulation of the trays within the aerated and purified water retained within the closed tank. Suitable means for selectively removing the suspended trays can be utilized through a port 26 in the top of the tank.

Figure 2:
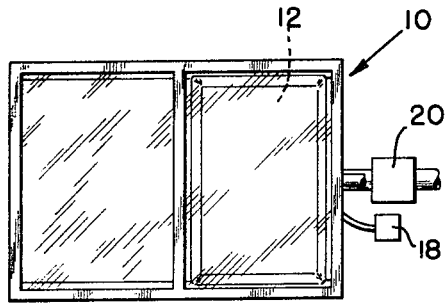
FIG. 2 is a plan view of the incubating apparatus illustrated in FIG. 1.
Figure 5:
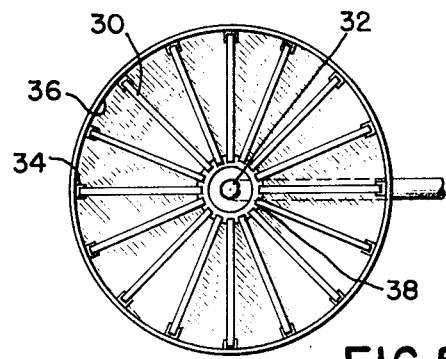
FIG. 5 is a plan view of the apparatus illustrated in FIG. 4.
Figure 4:
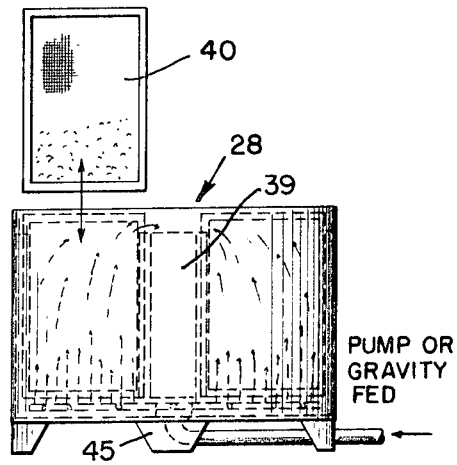
FIG. 4 is a side elevational and sectional view of an alternative embodiment of the present invention having a plurality of trays held in circular alignment.

To provide an alternative incubating apparatus with perhaps even greater egg capacity, a circular drum 28 (FIG. 4) supports a plurality of trays, such as that indicated as 30, resting on edge and radially extending from a water circulating apparatus 32 in a manner best shown in FIG. 5. Suitable retaining means 34 are affixed to the interior wall 36 of the drum 28 and to the exterior 38 of the water return column 39 so that the trays will be substantially rigid in their designated locations.

Eggs may be positioned and retained in a random fashion across the surface 40 of the tray by the use of preferably two layers of a fine mesh fabric or semi-rigid fiberglass material so that there will be no obstruction to water flow. Trays can be selectively lifted from the circular drum for inspection or removal.

Figure 6:
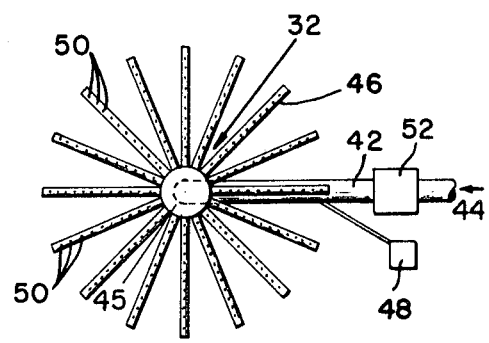
FIG. 6 is a plan view of the water circulating member situated beneath the plurality of circularly aligned trays so that water can be circulated upwardly through the trays to envelop the eggs held therein.

The water circulating apparatus 32 is illustrated in FIG. 6 and essentially comprises an input conduit 42 extending from a water source 44 which has been aerated by a suitable unit 48 and a manifold device 45 surrounding the base of the water return column 39. A plurality of a radially extending tubular members 46 extend outwardly from manifold device 45 and are preferably located directly beneath each of the tray positions so that water can be circulated directly upwardly through the trays through a plurality of apertures 50 (see arrows in FIG. 4). An ultraviolet light generating source 52 is located remote from the drum and in series with input conduit 42 so that purification of the water can take place before the water enters tank 28.

It will be very apparent from the present illustrations and descriptions that there is no limitation on the number of trays and the size of the frame within which eggs may be positioned for hatching. Thus the limitations inherent in conventional equipment and processes which severely restrict the magnitude of the hatching operation are overcome. The optimum advantages of the present invention are achieved by recirculating a predetermined amount of water over the eggs since the purification level of the water is more easily maintained, however satisfactory results are achieved by continuously drawing from fresh water.

While a primary and two alternative embodiments of a fish hatching apparatus in conjunction with a novel hatching method have been described, it will be obvious to those skilled in the art that the invention is not limited to those primary and alternative embodiments but only by the scope of the following claims.

I claim:

1. Apparatus for continuously incubating fish eggs comprising: a frame, a plurality of releasably secured trays each supporting a quantity of fish eggs and disposed in symmetrical alignment with each other in said frame; a tank enclosing said frame and trays; a source of water filling said tank and continuously surrounding and circulating about said trays and the eggs in said trays; means circulating said water; means aerating said water; means applying ultraviolet rays to said water prior to the introduction of said water to the eggs; and means recirculating a predetermined quantity of said water through said trays, said aerating means and said ultraviolet applying means, said trays positioned vertically and radially about said water circulating means.

* * * * *